United States Patent [19]

Sacripante et al.

[11] Patent Number: 5,916,996
[45] Date of Patent: Jun. 29, 1999

[54] POLYESTER-IMIDE TONER AND DEVELOPER COMPOSITIONS

[75] Inventors: Guerino G. Sacripante, Oakville; Melvin D. Croucher, St. Catharines; Stephan V. Drappel, Toronto, all of Canada

[73] Assignee: Xerox Corporation, Stamford, Conn.

[21] Appl. No.: 08/264,264

[22] Filed: Jun. 23, 1994

Related U.S. Application Data

[62] Division of application No. 08/144,964, Oct. 28, 1993, Pat. No. 5,348,831.

[51] Int. Cl.$^6$ .................................................... C08G 73/16
[52] U.S. Cl. .......................... 528/170; 528/172; 528/173; 528/183; 528/220; 528/229; 528/271; 528/272; 528/274; 528/288; 528/322; 528/332; 528/335; 528/338; 528/350; 528/353
[58] Field of Search ...................................... 528/170, 172, 528/173, 271, 272, 274, 288, 322, 335, 338, 350, 332, 353, 183, 220, 229

[56] References Cited

FOREIGN PATENT DOCUMENTS 06111627  9/1992  Japan .

*Primary Examiner*—James J. Seidleck
*Attorney, Agent, or Firm*—E. O. Palazzo

[57] ABSTRACT

A process for the preparation of polyester-imide resin of the formula

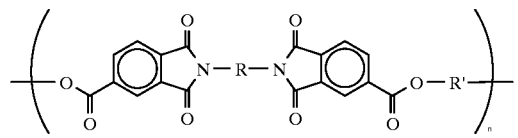

wherein n represents the number of segments present and is a number of from about 10 to about 10,000; R' is alkyl or alkylene; and R is independently an oxyalkylene or a polyoxyalkylene by the reaction of trimellitic acid, or a trimellitic anhydride, a glycol and a diamine of the formula

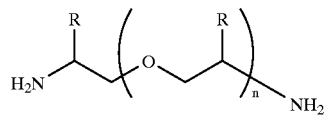

wherein R represents a hydrogen or alkyl group; and n represents the number of monomer segments, and is a number of from about 1 to about 10, and which reaction is accomplished by heating the aforementioned components.

7 Claims, No Drawings

POLYESTER-IMIDE TONER AND DEVELOPER COMPOSITIONS

This is a division of application Ser. No. 144,964, filed Oct. 28, 1993 now U.S. Pat. No. 5,348,831.

BACKGROUND OF THE INVENTION

This invention is generally directed to toner and developer compositions, and more specifically, the present invention is directed to developer and toner compositions containing novel polyester-imide resins, and process for the preparation thereof. In embodiments, there are provided in accordance with the present invention, toner compositions comprised of polyester-imide resins, and pigment particles comprised of, for example, carbon black, magnetites, or mixtures thereof, cyan, magenta, yellow, blue, green, red, or brown components, or mixtures thereof thereby providing for the development and generation of black and/or colored images. In embodiments, there are provided in accordance with the present invention toners with economical polyester-imide resins of the following formula, and which imides can be prepared by melt condensation processes

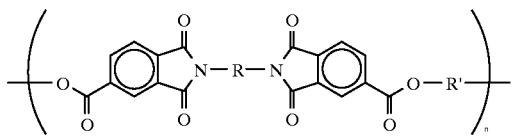

wherein R is an alkylene, and more specifically an oxyalkylene or a polyoxyalkylene, wherein alkylene contains, for example, 1 to about 20 carbon atoms, such as diethylene oxide, triethyleneoxide or polyoxypropylene, and R' is alkyl or alkylene containing, for example, from about 1 to about 25 carbon atoms; and wherein n represents the number of segments, thus n can be a number of from about 5 and preferably 10 to about 10,000. The toner compositions of the present invention in embodiments possess a number of advantages such as low cost, low melting characteristics, excellent blocking characteristics, high glass characteristics, excellent admix characteristics, excellent nonvinyl-offset properties, and low relative humidity sensitivity such as from about 1.01 to about 2.3. The polyester-imide resin of the present invention can in embodiments be generated by a process involving the melt polycondensation of about 0.95 to about 1.05 mole equivalent of anhydride such as a trimellitic anhydride, from about 0.45 to about 0.55 mole equivalent of a diol such as ethanediol or 1,2-propanediol, and of from about 0.45 to about 0.55 mole equivalent of an alkylene diamine, or preferably diaminoterminated alkylene oxides such as the diamino terminated polypropylene oxide or diaminoterminated polyethylene oxide available from Texaco Chemicals as JEFFAMINE D-230™, D-400™, D-700™, EDR-148™, EDR-192™, and it is believed as illustrated by the formula

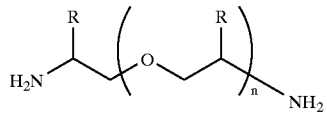

wherein
EDR-148 n=2; R=H
EDR-192 n=3; R=H
D-230 n=2,3; R=CH$_3$
D-400 n=5,6; R=CH$_3$ The aforementioned polyester-imides exhibit in embodiments, for example, a number average molecular weight of from about 1,500 to about 50,000, and preferably about 20,000 grams per mole as measured by vapor phase osmometry, and possess a glass transition temperature of from about 40° C. to about 80° C., and more preferably from about 50° C. to about 65° C. as measured by the Differential Scanning Calorimeter, and an $M_w$ of from about 2,500 to about 100,000.

Specifically, in embodiments, the present invention is directed to toner compositions comprised of a pigment, charge control agent and the polyester-imide resins as illustrated herein, and which toners possess low fixing of from about 120° C. to about 140° C., high gloss such as from about 50 gloss units to about 80 gloss units as measured by the Garner Gloss metering unit, nonvinyl offset properties and in addition low relative humidity sensitivity such as from about 1.0 to about 2.0. These and other advantages are attained by the toner compositions of this invention comprised of a pigment, optionally a charge control agent and a polyester-imide resin derived from a trimellitic anhydride, a diol and organodiamine, which compositions exhibit low fixing temperature characteristics of from about 120° C. to about 140° C., high gloss such as from about 50 gloss units to about 80 gloss units, nonvinyl offset properties, and low relative sensitivity such as from about 1.0 to about 2.3.

Examples of advantages of the toner composition of the present invention comprised of polyester-imide include the enablement of low fusing temperatures, such as from about 120° C. to about 140° C., and therefore lower fusing energies are needed for image and toner fixing thus enabling less power consumption during fusing, and permitting extended lifetimes for the fuser system selected. Furthermore, the toner composition of the present invention in embodiments possess a broad fusing latitude such as from about 40° C. to about 100° C. with a minimal amount or avoidance of release oil, which oil inhibits the toner from offsetting onto the fuser rollers usually associated with ghosting or background images on subsequent copies. Furthermore, the fused image obtained from the toner composition of the present invention in embodiments does not substantially offset to vinyl covers, such as those utilized for notebook binders, and possess a low humidity sensitivity ratio of from about 1 to about 2.3 as calculated by the ratio of the triboelectric charge in microcoulombs per gram of the developer after placed in a chamber of 20 percent humidity for 48 hours, to the triboelectric charge in microcoulombs per gram of the developer after placed in a chamber of 80 percent humidity for 48 hours.

In designing resins for toner composition, it is generally desired that the glass transition temperature of the resin be from about 50° C. to about 65° C., and preferably no less than about 55° C. so that, for example, the toner particles do not aggregate, coalesce or block during the manufacturing, transport or storage process or until the toner is required for the electrophotographic, especially xerographic, fixing step. Additionally, low fusing characteristics are required, hence the resin should melt or flow at a low temperature such as from about 120° C. to about 145° C. Moreover, low relative humidity sensitivity of toners, such that the triboelectric charge is stable to changes in environmental humidity conditions, is of importance.

Illustrated in the following copending applications, the disclosures of each being totally incorporated herein by reference, are:

U.S. Ser. No. 08/144,075 filed Oct. 28, 1993, now U.S. Pat. No. 5,411,831, illustrates a toner composition comprised of a pigment and a crosslinked polyimide; and wherein the crosslinked polyimide can be obtained from the reaction of a peroxide with an unsaturated polyimide of the formula

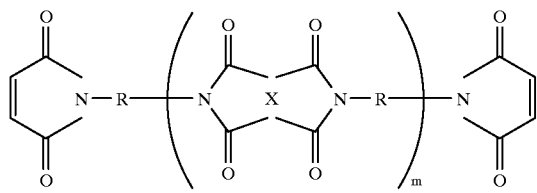

wherein X is

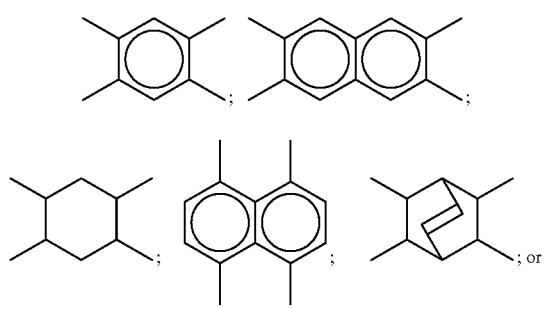

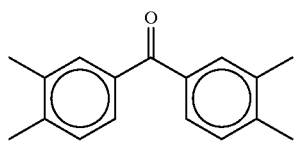

R is alkyl or oxyalkylene and m represents the number of monomer segments present and is a number of from about 10 to about 1,000.

U.S. Ser. No. 08/144,455 filed Oct. 28, 1993, now U.S. Pat. No. 5,348,830, illustrates a toner composition comprised of a pigment, and a thermotropic liquid crystalline polyimide of the formula

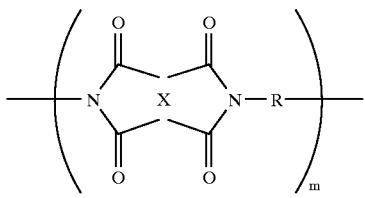

wherein m represents the number of monomer segments present; X is a symmetrical moiety independently selected from the group consisting of phenyl, naphthyl, cyclohexyl, or bicycloaliphatic; and R is independently selected from the group consisting of alkyl, oxyalkylene and polyoxyalkylene.

U.S. Ser. No. 08/144,956 filed Oct. 28, 1993, now U.S. Pat. No. 5,413,889, illustrates a toner composition comprised of pigment, and polyimide of the formula

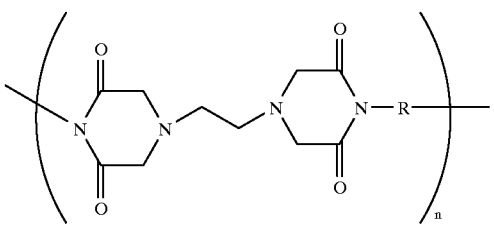

wherein n represents the number of monomer segments, and is a number of from about 10 to about 1,000; and R is alkyl, oxyalkyl, or polyoxyalkyl.

U.S. Ser. No. 08/144,918 filed Oct. 28, 1993, now U.S. Pat. No. 5,413,888, illustrates a toner composition comprised of pigment, and polyimide of the formula

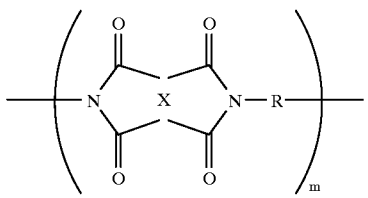

wherein m represents the number of monomer segments present; X is

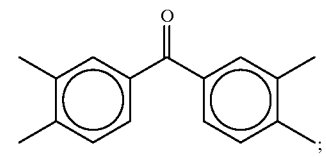

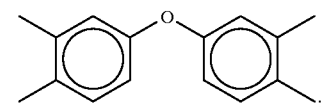

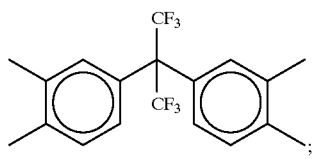

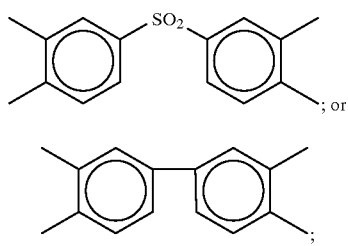

thus X can be benzophenone, oxydiphthalic, hexafluoropropane diphenyl, diphenyl sulfone, or biphenyl; and X is attached to four imide carbonyl moieties; and R is independently selected from the group consisting of alkyl, oxyalkylene and polyoxyalkylene.

The present invention enables toners with high gloss, low fusing temperatures, and low relative humidity sensitivity and the resins of the present invention are of lower cost then those of the copending applications based on information estimates utilizing the *Chemical Marketing Reporter*.

Polyimide resins, liquid crystalline polyimide resins, and, more specifically, polyester-imide resins are also known such as summarized and illustrated in the *Encyclopedia of Polymer Science and Engineering*, 2nd Edition, Volume No. 12, published by Wiley (1985). However, these polyimide resins are aromatic and useful as high performance materials, and are not, it is believed, useful for toner applications, and additionally polyester-imide resins with flexible diamino alkane moieties and, more specifically, polyoxyalkylene moieties are not mentioned.

SUMMARY OF THE INVENTION

It is an object of the present invention to provide toner and developer compositions with many of the advantages illustrated herein.

In another object of the present invention there are provided toner compositions with polyester-imide, and which toners are useful for the development of electrostatic latent images including color images.

In yet another object of the present invention there are provided processes for the preparation of polyester-imide, and wherein such processes include the reaction of aminoterminated alkylene oxides, trimellitic anhydrides, diamines, glycols, and amino acids or amino alcohols.

Further, in another object of the present invention there are provided toner compositions comprised of polyesterimides with low melt fusing temperatures of from about 130° C. to about 145° C.

Also, in another object of the present invention there are provided toner compositions comprised of polyester-imides with low melt fusing temperatures of from about 130° C. to about 145° C., and broad fusing latitude of from about 30° C. to about 60° C.

Additionally, in another object of the present invention there are provided toner compositions comprised of a polyester-imide with glass transition temperature of from about 50° C. to about 65° C.

In yet another object of the present invention there are provided toner compositions comprised of polyester-imide resin with a number average molecular weight of from about 1,500 grams per mole to about 100,000 grams per mole as measured by GPC.

In yet in another object of the present invention there are provided developer compositions comprised of a toner which displays high projection efficiency on a transparency, such as from about 60 to about 99 percent projection, determined by a Match Scan II spectrophotometer available from Diana Inc..

It is an additional object of the present invention to provide a toner which displays high gloss such as from about 30 to about 60 gloss units as measured by the Gardner Gloss metering unit.

Moreover, it is an object of the present invention to provide a toner which displays low relative sensitivity such as from about 1.0 to about 2.3 as measured from the triboelectric charge ratio at the 20 percent humidity level to the 80 percent humidity level.

Another object of the present invention resides in the formation of toners which will enable the development of images in electrophotographic imaging apparatuses, which images have substantially no background deposits thereon, are substantially smudge proof or smudge resistant, and therefore are of excellent resolution; and further, such toner compositions can be selected for high speed electrophotographic apparatuses, that is those exceeding 70 copies per minute.

Also, in another object of the present invention there are provided developer compositions comprised of toner and carrier particles.

These and other objects of the present invention can be accomplished in embodiments thereof by providing toner compositions comprised of polyimide-imine of the formulas as illustrated herein, pigment particles and known optional toner additives.

The polyester-imide resins of the present invention can be prepared as illustrated herein, and more specifically by charging a reactor equipped with a bottom drain valve, double turbine agitator and distillation receiver with a cold water condenser with from about 0.85 to about 0.99 mole of anhydride such as or trimellitic anhydride or acid such as trimellitic acid, 0.45 to about 0.5 mole of diol such as an alkane diol with from about 1 to about 25 carbon atoms and preferably from 1 to about 10, such as methane diol, propane diol, butane diol, pentane diol, hexane diol, ethanediol or 1,2-propanediol, and 0.45 to about 0.5 mole of flexible diamine such as diaminoterminated polyoxypropylenes available as JEFFAMINE 230™ from Texaco Chemicals. The reactor is then heated to from about 150° C. to about 170° C. with stirring for a duration of from about 3 hours whereby 0.5 to about 0.9 mole of water byproduct is collected in the distillation receiver. The mixture is then heated at from about 180 to about 210° C., after which the pressure is slowly reduced from atmospheric pressure to about 300 Torr, over a period of from about one hour to about 5 hour period with collection of approximately 0.1 to about 0.3 mole of water in the distillation receiver, and wherein the total amount of water collected from the beginning of the reaction is from about 0.95 to about 1.0 mole equivalent. The reactor is then purged with nitrogen to atmospheric pressure, and the resulting polyester-imide collected through the bottom drain valve. The glass transition temperature of the resin can then be measured to be of from about 45° C. to about 65° C. (onset) utilizing the 910 Differential Scanning Calorimeter available from DuPont operating at a heating rate of 10° C. per minute. The weight average molecular weight was measured in embodiments to be from about 2,500 grams per mole to about 100,000, and preferably 30,000 gram per mole by vapor phase calorimetry.

Specific examples of polyester-imide resins of the present invention include poly(oxyethyloxy-bis(4,4'-carbonyl, 1,2, 1',2'-phthalimidyl)-dipropyloxy), poly(oxyethyloxy-bis(4, 4'-carbonyl, 1,2,1',2'-phthalimidyl)-tripropyloxy), poly (oxyethyloxy-bis(4,4'-carbonyl, 1,2,1',2'-phthalimidyl)-tetrapropyloxy), poly(oxyethyloxy-bis(4,4'-carbonyl, 1,2,1', 2'-phthalimidyl)-pentapropyloxy), poly(oxypropyloxy-bis (4,4'-carbonyl, 1,2,1',2'-phthalimidyl)-dipropyloxy), poly (oxypropyloxy-bis(4,4'-carbonyl, 1,2,1',2'-phthalimidyl)-tripropyloxy), poly(oxypropyloxy-bis(4,4'-carbonyl, 1,2,1', 2'-phthalimidyl)-tetrapropyloxy), copoly(oxyethyloxy-bis (4,4'-carbonyl, 1,2,1',2'-phthalimidyl)-tripropyloxy), copoly (oxyethyloxy-bis(4,4'-carbonyl, 1,2,1',2'-phthalimidyl)-pentapropyloxy), which resin is present in the toner in various effective amounts such of from about 85 percent by weight to about 98 percent by weight of the toner comprised of, for example, resin and pigment.

Specific examples of acid or anhydride components that can be selected in various effective amounts of, for example, from about 0.45 to about 0.55 mole equivalent of polyesterimide are trimellitic anhydride, trimellitic acid, 1,2,4-benzene tricarboxylic acid, 1,2,4-cyclohexane tricarboxylic acid, mixtures thereof and the like.

Specific examples of diols that can be selected in various effective amounts of, for example, from about 0.45 to about 0.55 mole equivalent of polyester-imide to prepare the polyester-imide include ethanediol, 1,2-propanediol, 1,3-propanediol, 1,4-butanediol, 2,4-butanediol, 3,4-butanediol, 1,5-pentanediol, 2,5-pentanediol, 3,5-pentanediol, 2,3-butanediol, 2,2-dimethyl-1,3-propanediol, 2-methyl-1,3-propanediol, neopentyl glycol, hexanediol, heptanediol, octanediol, nonanediol, decanediol, mixtures thereof and the like.

Specific examples of diamino alkanes or diamino alkylene oxides that can be utilized to prepare the polyester-imide include diaminoethane, diaminopropane, 2,3-diaminopropane, diaminobutane, diaminopentane, diamino-2-methylpentane also known as DYTEK A™ available from DuPont Chemical Company, diaminohexane, diaminotrimethylhexane, diaminoheptane, diaminooctane, diaminononane, diaminodecane, diaminododecane, diaminoterminated-ethylene oxide, diaminoterminated-diethylene oxide available as JEFFAMINE EDR-148™ from Texaco Chemicals, diaminoterminated-diethylene oxide available as JEFFAMINE EDR-148™ from Texaco Chemicals, diaminoterminated-triethylene oxide available as JEFFAMINE EDR-192™ from Texaco Chemicals, diaminoterminated-polyoxypropylene oxide available as JEFFAMINE D-230™, JEFFAMINE 400™, JEFFAMINE T-403™, JEFFAMINE 700™ all available from Texaco Chemicals, mixtures thereof and the like; and this reactant can be selected in various effective amounts of, for example, from about 0.45 mole equivalent to about 0.55 mole equivalent of the polyimide resin.

Various known colorants present, for example, in the toner in an effective amount of, for example, from about 1 to about 25 percent by weight of toner, and preferably in an amount of from about 1 to about 15 weight percent, that can be selected include carbon black like REGAL 330® magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites BAYFERROX 8600™, 8610™; Northern Pigments magnetites NP-604™, NP-608™; Magnox magnetites TMB-100™, or TMB-104™; and other equivalent black pigments. As colored pigments there can be selected known cyan, magenta, yellow, red, green, brown, blue or mixtures thereof. Specific examples of pigments include HELIOGEN BLUE L6900™, D6840™, D7080™, D7020™, PYLAM OIL BLUE™ and PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E. D. TOLUIDINE RED™ and BON RED C™ available from Dominion Color Corporation, Ltd., Toronto, Ontario, NOVAperm YELLOW FGL™, HOSTAPERM PINK E™ from Hoechst, and CINQUASIA MAGENTA™ available from E. I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be used as pigments. The pigments are selected in various effective amounts of, for example, from about 1 weight percent to about 65, and preferably from 1 to about 10 weight percent of the toner.

The toner may also include in effective amounts, such as from about 0.1 to about 10 weight percent, known charge additives such as alkyl pyridinium halides, bisulfates, the charge control additives of U.S. Pat. Nos. 3,944,493; 4,007,293; 4,079,014; 4,394,430, and 4,560,635 which illustrates a toner with a distearyl dimethyl ammonium methyl sulfate charge additive, the disclosures of which are totally incorporated herein by reference, and negative charge additives like aluminum complexes, such as BONTRON E-88™ available from Orient Chemicals of Japan, and those illustrated in U.S. Pat. No. 5,223,368 (D/90404), the disclosure of which is totally incorporated herein by reference, ALHOS and the like.

Surface additives in effective amounts, such as from about 0.1 to about 3 weight percent, that can be added to the toner compositions of the present invention include, for example, metal salts, metal salts of fatty acids, colloidal silicas, mixtures thereof and the like, reference U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa. Also, waxes, such as polypropylene and polyethylene, with low molecular weights of from about 1,000 to about 10,000 in effective amounts of from about 0.1 to about 3 weight percent can be added to the toner further aiding in release of the developed image.

In another embodiment of the present invention, there are provided, subsequent to known micronization and classification, toner particles with an average volume diameter as determined by a Coulter Counter of from about 5 to about 20 microns comprised of polyester-imide resin, pigment particles, and optional charge enhancing additives.

The polyester-imide resin can be present in a sufficient, but effective amount, for example from about 70 to about 95 weight percent. Thus, when 1 percent by weight of the charge enhancing additive is present, and about 3 to 10 percent by weight of pigment or colorant, such as carbon black, is contained therein, about 96 to about 89 percent by weight of resin is selected. Also, the charge enhancing additive may be coated on the pigment particle.

Developer compositions can be prepared by admixing the toner of the present invention with carrier particles, such as steel, ferrites, iron powders, silicon, and the like, coated or uncoated, reference for example U.S. Pat. Nos. 3,526,533; 3,590,000; 3,767,578; 3,839,029; 3,914,181; 4,937,166 and 3,935,326, the disclosures of which are totally incorporated herein by reference.

The toner and developer compositions of the present invention may be selected for use in electrostatographic imaging apparatuses containing therein conventional photoreceptors. Thus, the toner and developer compositions of the present invention can be used with layered photoreceptors that are capable of being charged negatively, such as those illustrated in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The following Examples are being supplied to further define various species of the present invention, it being noted that these Examples are intended to illustrate and not limit the scope of the present invention. Parts and percentages are by weight unless otherwise indicated.

EXAMPLE I

A polyester-imide derived from trimellitic anhydride, 1,2-propanediol and diaminoterminated polyoxypropylene with an average molecular weight of 230 grams/mole, and available as JEFFAMINE D-230™ from Texaco Chemical Company was prepared as follows:

Trimellitic anhydride (172 grams), 1,2-propanediol (68.3 grams), JEFFAMINE 230™ (103.5 grams), and FASCAT™ (0.27 gram) were charged into a 1 liter Parr reactor equipped with a mechanical stirrer, distillation receiver and bottom valve drain. The resulting mixture was heated to 150° C. over a 1 hour period, followed by increasing the temperature to 190° C. whereby 25 grams of water were collected in the distillation receiver during a 4 hour period. The resulting mixture was then maintained at 190° C. for an additional hour and the pressure was decreased slowly to 2 millibars over a 120 minute period, during which time an additional 24 grams of byproduct was collected in the distillation receiver. The reactor was then pressurized to atmospheric pressure, 760, with nitrogen, the bottom drain of the reactor was then opened, and the polyester-imide resin product poly(oxy-1,2-propyl-bis(4,4'-carbonyl, 1,2,1',2'-phthalimidyl) polyoxypropyl was allowed to pour into a container cooled with dry ice. There were obtained 150 grams of the resin. The glass transition temperature of the resin was measured using the DuPont Differential Scanning Calorimeter at 10° C. per minute and found to be 49° C.

EXAMPLE II

A polyester-imide derived from trimellitic anhydride, 1,2-propanediol and diaminoterminated polyoxypropylene with an average molecular weight of 230, and available as JEFFAMINE EDR-148™ from Texaco Chemical Company was prepared as follows:

Trimellitic anhydride (172 grams), 1,2-propanediol (68.3 grams), JEFFAMINE EDR-148™ (66.6 grams), and FASCAT™ (0.27 gram) were charged into a 1 liter Parr reactor equipped with a mechanical stirrer, distillation receiver and bottom valve drain. The mixture was heated to 150° C. over a 1 hour period, followed by increasing the temperature to 190° C. whereby 30 grams of water were collected in the distillation receiver during a 4 hour period. The resulting mixture was then maintained at 190° C. for an additional hour and the pressure was decreased slowly to 2 millibars over a 120 minute period, during which time an additional 18.3 grams of propanediol were collected in the distillation receiver. The reactor was then pressurized to atmospheric pressure with nitrogen to atmospheric pressure, and the bottom drain of the reactor was then opened, the polyester-imide resin was allowed to pour into a container cooled with dry ice. There were obtained 153 grams of the resin poly (oxy-1,2-propyl-bis(4,4'-carbonyl, 1,2,1',2'-phthaloimidyl)-di-oxypropylene). The number average molecular weight of the resin resulting was then measured to be 4,500 grams per mole by vapor phase osmometry using toluene as the solvent. The glass transition temperature of the resin was measured using the DuPont Differential Scanning Calorimeter at 10° C. per minute and found to be 63° C.

EXAMPLE III

A polyester-imide derived from trimellitic anhydride, 1,2-propanediol and diaminoterminated polyoxypropylene with an average molecular weight of 192 grams/mole, and available as JEFFAMINE EDR-192™ from Texaco Chemical Company was prepared as follows:

Trimellitic anhydride (172 grams), 1,2-propanediol (68.3 grams), JEFFAMINE EDR-192™ (86.4 grams), and FASCAT™ (0.27 gram) were charged into a 1 liter Parr reactor equipped with a mechanical stirrer, distillation receiver and bottom valve drain. The mixture was heated to 150° C. over a 1 hour period, followed by increasing the temperature to 190° C. whereby 25.4 grams of water were collected in the distillation receiver during a 4 hour period. The mixture was then maintained at 190° C. for an additional hour and the pressure was decreased slowly to 2 millibars over a 120 minute period, during which time an additional 29 grams of byproduct were collected in the distillation receiver. The reactor was then pressurized to atmospheric pressure with nitrogen, and the bottom drain of the reactor was then opened, and the polyester-imide resin was allowed to pour into a container cooled with dry ice, and the amount of resin collected was measured to be 152 grams of the resin poly(oxy-1,2-propyl-bis(4,4'-carbonyl, 1,2,1',2'-phthaloimidyl)-tri-oxypropylene). The glass transition temperature of the resin was measured using the DuPont Differential Scanning Calorimeter at 10° C. per minute and found to be 40° C.

EXAMPLE IV

A polyester-imide derived from trimellitic anhydride, 1,2-propanediol and diamino terminated polyoxypropylene with an average molecular weight of 148 grams/mole, and available as JEFFAMINE EDR-148™ and JEFFAMINE T403™ from Texaco Chemical Company was prepared as follows:

Trimellitic anhydride (172 grams), 1,2-propanediol (68.3 grams), JEFFAMINE EDR-148™ 63.7 grams), JEFFAMINE T-403™ (9 grams), and FASCAT (0.27 gram) were charged into a 1 liter Parr reactor equipped with a mechanical stirrer, distillation receiver and bottom valve drain. The mixture was heated to 150° C. over a 1 hour period, followed by increasing the temperature to 190° C. whereby 27 grams of water was collected in the distillation receiver during a 4 hour period. The mixture was then maintained at 190° C. for an additional hour and the pressure was decreased slowly to 2 millibars over a 120 minute period, during which time an additional 31 grams of byproduct was collected in the distillation receiver. The reactor was then pressurized to atmospheric pressure with nitrogen, and the bottom drain of the reactor was then opened, and the polyester-imide resin was poured into a container cooled with dry ice, and the amount of resin collected was measured to be 145 grams. The resin product was poly(oxy-1,2-propyl-bis(4,4'-carbonyl, 1,2,1',2'-phthaloimidyl)-di-oxypropylene). The glass transition temperature of the resin was measured using the Dupont Differential Scanning Calorimeter at 10° C. per minute and found to be 55° C.

EXAMPLE V

A toner composition comprised of 98 percent by weight of the polyimide-imine resin of Example I and 2 percent by weight of PV FAST BLUE™ pigment was prepared as follows:

The polyester-imide resin of Example I was in the form of a large chunk. The resulting polymer was ground to about 500 microns in a Model J Fitzmill equipped with an 850 micrometer screen. After grinding, 117.6 grams (98 percent by weight of toner) of polymer were mixed with 2.4 grams of PV FAST BLUE™ pigment (2 percent by weight of toner) available from Hoechst Chemical Corporation. The two components were dry blended first on a paint shaker and then on a roll mill. A small CSI™ counterrotating twin screw extruder, available from Customs Scientific Instrumentations, was then used to melt mix the aforementioned components at a barrel temperature of 140° C., screw rotational speed of 50 rpm, and at a feed rate of 2 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 5.9 microns with a geometric distribution of 1.37 as measured by the Coulter Counter. The resulting toner was then utilized without further classification. A developer composition was prepared by roll milling the aforementioned toner, 3 parts by weight with 100 parts by weight of carrier comprised of a ferrite or steel core coated with 0.175 weight percent of a terpolymer of styrene, methylmethacrylate, and vinyl triethoxy silane, which carrier is available from Xerox Corporation. The tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 1.95. Unfused copies were then produced using a Xerox Corporation 1075 imaging apparatus with the fusing system disabled. The unfused copies were then subsequently fused on a laboratory soft roll fuser. Fusing evaluation of the toner indicated a minimum fixing temperature of about 141° C. as measured by the known Crease tests, a gloss 50 temperature of about 128° C., and a hot-offset temperature of 170° C.

EXAMPLE VI

A toner composition comprised of 98 percent by weight of the polyimide-imine resin of Example II and 2 percent by weight of PV FAST BLUE™ pigment was prepared as follows:

The polyester-imide resin of Example I was in the form of a large chunk. The resulting polymer was ground to about 500 microns in a Model J Fitzmill equipped with an 850 micrometer screen. After grinding, 117.6 grams (98 percent by weight of toner) of polymer were mixed with 2.4 grams of PV FAST BLUE™ pigment (2 percent by weight of toner) available from Hoechst Chemical Corporation. The two components were dry blended first on a paint shaker and then on a roll mill. A small CSI™ counterrotating twin screw extruder, available from Customs Scientific Instrumentations, was then used to melt mix the aforementioned mixture at a barrel temperature of 140° C., screw rotational speed of 50 rpm, and at a feed rate of 2 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 6.1 with a geometric distribution of 1.38 as measured by the Coulter Counter. The resulting toner was then utilized without further classification. A developer composition was prepared by roll milling the aforementioned toner, 3 parts by weight with 100 parts by weight of the Xerox Corporation carrier of Example V. The tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 2.1. Unfused copies were then produced using a Xerox Corporation 1075 imaging apparatus with the fusing system disabled. The unfused copies were then subsequently fused on a laboratory soft-roll fuser. Fusing evaluation of the toner indicated a minimum fixing temperature of about 144° C. as measured by the known Crease tests, a gloss 50 temperature of about 131° C., and a hot-offset temperature of 180° C.

EXAMPLE VII

A toner composition comprised of 98 percent by weight of the polyimide-imine resin of Example IV and 2 percent by weight of PV FAST BLUE™ pigment was prepared as follows:

The polyester-imide resin of Example I was in the form of a large chunk. The resulting polymer was ground to about 500 microns in a Model J Fitzmill equipped with an 850 micrometer screen. After grinding, 117.6 grams (98 percent by weight of toner) of polymer were mixed with 2.4 grams of PV FAST BLUE™ pigment (2 percent by weight of toner) available from Hoechst Chemical Corporation. The two components were dry blended first on a paint shaker and then on a roll mill. A small CSI™ counterrotating twin screw extruder available from Customs Scientific Instrumentations was then used to melt mix the aforementioned mixture at a barrel temperature of 140° C., screw rotational speed of 50 rpm, and at a feed rate of 2 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 6.0 microns with a geometric distribution of 1.39 as measured by the Coulter Counter. The resulting toner was then utilized without further classification. A developer composition was prepared by roll milling the aforementioned toner, 3 parts by weight, with 100 parts by weight of the Xerox Corporation carrier with a 0.175 weight percent coating. The tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 1.9. Unfused copies were then produced using a Xerox Corporation 1075 imaging apparatus with the fusing system disabled. The unfused copies were then subsequently fused on a customized soft roll fuser. Fusing evaluation of the toner indicated a minimum fixing temperature of about 140° C. as measured by the known Crease tests a gloss 50 temperature of about 131° C., and a hot-offset temperature of 170° C.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of polyester-imide resin of the formula

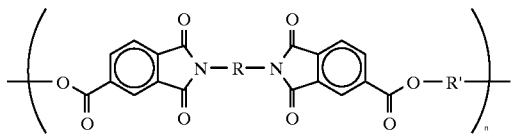

wherein n represents the number of segments present and is a number of from about 10 to about 10,000; R' is alkyl or alkylene; and R is independently selected from the group consisting of an oxyalkylene and polyoxyalkylene consisting essentially of the reaction of trimellitic acid, or a trimellitic anhydride, a glycol and a diamine of the formula

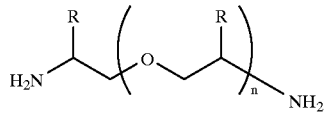

wherein R represents a hydrogen or alkyl group; and n represents the number of monomer segments, and is a number of from about 1 to about 10, and which reaction is accomplished by heating the aforementioned components and thereafter isolating said polyester-imide resin.

2. A process in accordance with claim 1 wherein the trimellitic anhydride or trimellitic acid is selected in an amount of from about 0.95 mole equivalents to about 1.05 mole equivalent of polyester-imide, the diol is selected in an amount of from about 0.45 to about 0.55 mole equivalent, and the diamine component is selected in an amount of from about 0.45 to about 0.55 mole equivalent of the polyester-imide.

3. A process in accordance with claim 1 wherein the diol monomer is selected from the group consisting of 1,2-ethanediol, 1,3-propanediol, 1,4-butanediol, 1,3-butanediol, 1,2-butanediol, 1,5-pentanediol, 1,4-pentanediol, 1,3-pentanediol, 1,2-pentanediol, 2,3-pentanediol, 3,4-pentanediol, 1,6-hexanediol, 3,3,5-trimethyl-1,6-hexanediol, cyclohexanediol, cyclohexanedimethanol, heptanediol, octanediol, nonanediol, decanediol, dodecanediol, 2-methyl-1,3-propanediol, 2,2-dimethyl-1,3-propanediol, diethyleneglycol, triethyleneglycol, and mixtures thereof.

4. A process in accordance with claim 1 wherein said heating is for a period of time of from about 60 minutes to about 120 minutes.

5. A process in accordance with claim 1 wherein said heating is for a period of time of from about 1 minute to about 300 minutes.

6. A process in accordance with claim 1 wherein n is 2 and R is hydrogen; n is 3 and R is hydrogen; n is 2 and R is methyl or n is 5 and R is methyl.

7. A process in accordance with claim 1 wherein trimellitic anhydride or 1,2-propanediol are selected.

* * * * *